Dec. 4, 1951 — C. H. FAY — 2,577,612
DIELECTRIC CONSTANT MEASUREMENT
Filed Aug. 28, 1948

Inventor: Charles H. Fay.
By
His Attorney

Patented Dec. 4, 1951

2,577,612

UNITED STATES PATENT OFFICE 2,577,612

DIELECTRIC CONSTANT MEASUREMENT

Charles H. Fay, Houston, Tex., assignor to Shell Development Company, San Francisco, Calif., a corporation of Delaware Application August 28, 1948, Serial No. 46,566

5 Claims. (Cl. 175—183)

This invention pertains to a method and a system for the measurement of dielectric constants of liquids and for the monitoring of said liquids with regard to changes of the dielectric constant thereof.

In many branches of industry, as for example in the chemical and petroleum industries, it is essential for the operator to be able to ascertain or measure the dielectric constant of a liquid or liquid product, since a deviation of the dielectric constant from a predetermined value may be indicative of a possible deviation of the composition of the product from a predetermined standard.

Such deviations or changes of composition may occur for example, when a non-aqueous liquid becomes contaminated with water or forms an emulsion therewith. In the petroleum industry, such contamination is especially undesirable in oil or oil products being charged to stills or transported over long distances by means of pipe lines.

Since the dielectric constant of water has a value of about 80, while the dielectric constants of non-aqueous compounds and liquids such, for example, as crude or refined oils or oil derivatives, are of an order of magnitude of about 2, the addition of water to such non-aqueous liquids, resulting in the formation of an emulsion, normally causes a detectable increase in the dielectric constant of said liquids. Thus, the addition of one per cent of water to a non-aqueous liquid raises its dielectric constant by about three per cent.

It is therefore an object of this invention to provide a method and an apparatus whereby a change in the composition of a liquid, and particularly the admixture of water thereto, may be detected by introducing said liquid between the plates of an electric condenser and measuring its dielectric constant, or ascertaining the changes in the value thereof.

It is a further and particular object of this invention to provide a system for monitoring the dielectric constant (and thus the composition) of a liquid. The term "monitoring" is used herein to define the steps of automatically detecting any change or tendency to change in the dielectric constant and the composition of a liquid during a predetermined time interval, ascertaining the direction of said change, and indicating said change in such a manner that measures may be taken to counteract said change.

It is also an object of this invention to provide a simple and compact system for selectively monitoring or measuring the dielectric constant of a liquid, said system being free of effects such as produced by relatively slow temperature changes of the liquid.

These and other objects of the invention will be understood from the following description taken with reference to the attached drawing, wherein.

Figure 1:
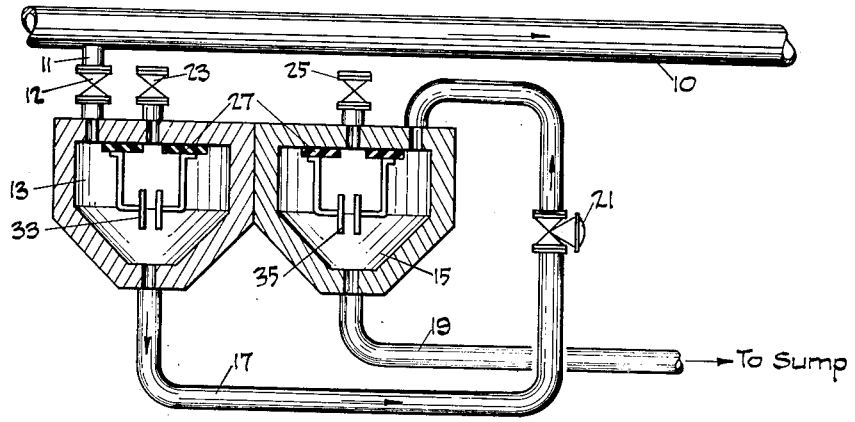
Fig. 1 is a diagrammatic view in cross-section of the condenser cells of the present invention.

Referring to Fig. 1, numeral 10 indicates a liquid container such as a tank, reservoir, pipe, etc. holding or flowing a liquid whose dielectric constant or whose degree of admixture with water it is desired to determine. Connected to the element 10 by a pipe 11, having a valve 12, is the apparatus of the present invention, comprising essentially a cell 13, connected to the pipe 11, and a cell 15 connected to the cell 13 by a pipe 17. Cell 15 is exhausted by a pipe 19 which may lead to a sump, back to the pipe 10, etc.

The pipe 17 is provided with suitable means, such for example as coils or restricted orifice means controlled, if desired, by adjustable valve means 21, so that the liquid filling the cell 13 reaches the cell 15 after a predetermined time delay; for example, the time required to transfer one full volume of the liquid in cell 13 to cell 15 may be adjusted to 15 minutes. Flow control means 21 may be transferred, if desired, from pipe 17 to pipe 11 or pipe 19, or similar flow control means may be installed in all of these pipes without affecting the operations of this invention.

Cells 13 and 15 are provided with valved vents 23 and 25 respectively, permitting the removal of air or gas from said cells.

Mounted within the cells 13 and 15 and electrically insulated therefrom as shown at 27, are condensers 33 and 35, respectively. The condensers 33 and 35 are diagrammatically shown in Fig. 1 as having two flat plates each, it being well understood by those familiar with the art that these condensers may actually be of the multiple plate type, the dielectric material between said plates consisting of the fluid filling the cells or flowing therethrough.

Figure 2:
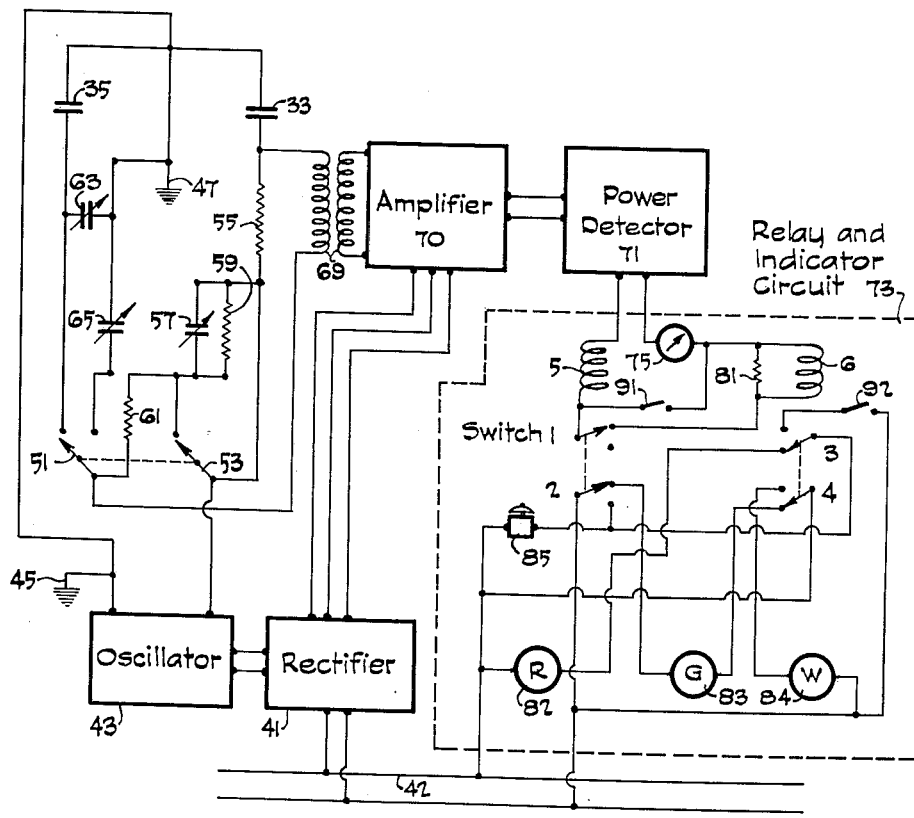
Fig. 2 is a diagram of the measuring and indicating bridge circuit comprising the condenser cells of Fig. 1.

The electrical connections to the condensers 33 and 35, omitted for clearness in Fig. 1, are shown in Fig. 2, giving a simplified diagram of the electrical system of the present invention.

Any desired source of D. C. power, such for example, as a rectifier 41 energized from an A. C. supply line 42, supplies an operating current to an oscillator 43, which is preferably of a crystal-controlled type operating at a frequency from 1 to 2 or more megacycles.

The output of the oscillator 43, which has one of its terminals grounded at 45, is supplied to a measuring bridge circuit having condensers 33 and 35 as two of the arms thereof with a ground 47 therebetween.

The oscillator 43 is connected to the measuring bridge, through a double-blade double throw switch 51—53. When the switch 51—53 is thrown to the left-hand position, as shown in the drawing, the measuring bridge is connected for monitoring. In this case, the arm opposite that comprising condenser 35 is formed of a resistance 55 and the arm opposite that comprising condenser 33 is formed of resistance 61. A trimmer condenser 63 is connected across condenser 35, for purposes to be described later. When the switch 51—53 is thrown to the right-hand position, the bridge is connected for measuring operations. It will be seen that in that case the condenser 35 is completely disconnected and replaced by a variable condenser 65. The arm opposite that comprising condenser 33 includes in this case resistance 61 and the parallel combination of variable condenser 57 and resistance 59, while the arm opposite that comprising condenser 65 comprises resistance 55.

Potentials appearing across the measuring bridge are in both cases applied, for example, by means of a transformer 69 to an amplifier 70 having any desired number of stages and receiving its operating power from rectifier 41. The output of amplifier 70 operates, through a power detector tube and circuit 71, a relay and indicator circuit generally indicated at 73.

The relay and indicator circuit 73 comprises an indicating device such as a milliammeter 75, and two relays 5 and 6. Relay 5 operates a double-throw switch having mechanically linked blades or contactors 1 and 2, while relay 6 operates a similar switch having contactors 3 and 4. It will be assumed in referring to Fig. 2 that upon energization of relay coils 5 and 6, contactors 1, 2, 3 and 4 are raised to their upper contact positions, and upon de-energization of the relays said contactors are released to their lower contact positions. Fig. 2 illustrates this circuit in position for normal monitoring operations with the relay 5 energized and the relay 6 deenergized. It will be seen that with switch 1 used to connect relay coils 5 and 6 in series, the deenergization of relay 5 will always cause the deenergization of relay 6. The opposite, however, does not always hold, since the energization of relay 5 does not necessarily bring about an operative energization of relay 6, which relay 6, having a resistance 81 in shunt therewith, requires more current for operation than relay 5, and will be operatively energized to pull up contactors 3 and 4 only when the current through the coils 5 and 6 reaches a predetermined intensity.

Suitably connected in the circuit 73 are three indicating lights 82, 83 and 84, such as, for example, red, green and white lights. The circuit is also provided with an alarm signal or bell 85, and a switch 91, which must be closed when changing from monitoring to measuring operations. An auxiliary switch 92 may be provided for selectively combining the operation of the signal 85 with that of the red light 82 only, or of both red and white lights 82 and 84.

The alarm or signal devices 82, 83, 84 and 85 are selectively energized by current from the power line 42 upon the closing of the proper contact switches 1, 2, 3 and 4.

In operation, the present device is normally used for monitoring purposes, that is, to protect a liquid storage or transport system from abrupt changes in composition or in degree of contamination by water. Since in such case an accurate measurement of the absolute value of the dielectric constant of a liquid is not necessary, it has been found that this object can be most simply and quickly achieved by comparing the dielectric constants of two samples of said liquid collected with a predetermined time lag therebetween.

This arrangement has the important advantage of making the measurements independent of dielectric constant changes due to outside effects such as slow changes of temperature. It is well-known that the dielectric constant of liquids such as oils, solvents, etc., varies considerably with temperature changes, said liquids having generally a negative dielectric constant temperature coefficient. Any apparatus wherein a condenser having the liquid under test for dielectric is matched against a standard or solid dielectric condenser must therefore be provided with a temperature compensating system, which necessity is avoided in the present arrangement by matching, during monitoring, two condenser cells filled with the same liquid and thus subjected to the same temperature effects.

For this purpose, the valve 12 in pipe 11 is opened, permitting the cell 13, and thereafter the cell 15, to become filled with the liquid. The switch 51—53 is set to the monitoring (left-hand) position, the switch 91 of the relay and indicator circuit being left open, after momentary closure for setting relay 5.

In monitoring operations, the bridge is intentionally unbalanced to a predetermined extent by suitably adjusting the setting of the condenser 63. This unbalancing of the bridge is effected in such a direction that an increase in capacitance of the condenser 33 tends to rebalance the bridge, driving said bridge towards and ultimately through the point of balance.

The system will therefore perform one of the following sequences of operations:

So long as there is no significant change in the composition of the liquid being tested, for example, no change in the percentage of water admixed or emulsified with the oil flowing in pipe 10 and passing through cells 13 and 15, the bridge will operate under the condition of unbalance to which it has been pre-set. The resulting unbalance current of predetermined intensity range is delivered, through transformer 69 and amplifier and power units 70 and 71, to the relay circuit 73, keeping coil 5 energized and contacts 1 and 2 closed in their upper positions. The coil 6 is however not operatively energized at this time, the predetermined normal unbalance current being of a range below that necessary for the operative energization of coil 6.

The circuit will therefore operate under these conditions with the green light 83 connected to the power supply line 42 by contactor 2 to indicate normal monitoring operations.

When a change occurs over a relatively short time interval in the dielectric constant of the liquid in pipe 10, this change will at first affect only condenser 33 in cell 13, but not condenser 35 in cell 15, since the transfer of the liquid between the two cells is subject to a predetermined time lag corresponding, for example, to the time necessary for completely renewing the liquid in a cell, which lag may be given any desired value, such for example, as 15 minutes, by adjusting the valve 21.

If, therefore, the amount of water admixed to the liquid in pipe 10, and therefore the dielectric constant of this liquid, starts to increase at a rapid rate, this increase, as stated above, will tend to rebalance the bridge circuit and thus to reduce the intensity of the unbalance voltage. When this current has thus been reduced to a value below that necessary for operatively energizing relay coil 5, switch contactors 1 and 2 are released to their lower position, causing coils 5 and 6 to become completely deenergized. At the same time, switch 2 in its lower contact position connects the red light 82 and alarm signal 85 to the power line 42.

The circuit will remain in this "alarm" position until relay 5 is manually reset for further operations by momentary closure of switch 91. This is of especial importance, since it requires the personal attention of the operator and insures that an increase in water content, which is a dangerous condition, shall not remain unnoticed.

It should also be noted that any failure in any of the parts of the system such as the oscillator, amplifier, power detector, etc., will react on the monitoring circuit in the same manner as described above and will therefore actuate the alarm devices.

If, on the other hand, the water content and the dielectric constant of the liquid in pipe 10 starts to decrease, this decrease acts further to unbalance the bridge. The unbalance current thus increases to a point above the maximum of its predetermined normal range and its intensity becomes sufficient to energize the relay coil 6. The closing of switches 3 and 4 with their upper contacts results in disconnecting the green light 83 and connecting the white light 84. If the switch 92 is closed, this will likewise connect the alarm 85 to the power line.

When it is desired to use the present apparatus for measuring instead of monitoring operations, the switch 51—53 is thrown to the right-hand position and the switch 91 within the relay unit 73 is closed. This results in entirely disconnecting condenser 35 from the measuring bridge and replacing it by a calibrated variable condenser 65, which is then matched, for measurement purposes, against condenser 33 in cell 13. Condensers 65 and 57 are adjusted for bridge balance, the balance point being determined by a minimum reading of indicator 75. The dielectric constant of the fluid in condenser 33 is then determined from the reading of calibrated condenser 65. It is understood that the present apparatus, even when set for measuring operations, that is, when using only one of the cells receiving the liquid, may be used for monitoring purposes by observing the variations in the reading of the indicator 75. The arrangement involving both cell 13 and cell 15 is, however, much preferred for monitoring purposes, since it permits a fully automatic operation and eliminates the necessity of taking readings, compensating for temperature and re-setting or re-calibrating the condenser 65 after a change from one type of fluid to another.

I claim as my invention:

1. A system for dielectric constant determinations comprising a first cell, liquid passage means for supplying a liquid to said cell, a second cell, restricted liquid passage means in communication between said cells for transferring the liquid from the first to the second cell at a rate substantially lower than that at which the liquid is supplied to the first cell, liquid passage means for removing the liquid from the second cell, electrical condenser means in each cell, the dielectric of said condensers being formed of the liquid in said cells, a measuring bridge circuit having each of said condenser means connected into an arm thereof, means for balancing said bridge, and means for indicating a change in the balance of said bridge caused by a change of the dielectric constant of the liquid in one of said cells.

2. A system for dielectric constant determinations comprising a first cell, liquid passage means for continuously supplying a liquid to said cell, a second cell, restricted liquid passage means in communication between said cells for continuously transferring the liquid from the first to the second cell with a substantial time lag, liquid passage means for continuously removing the liquid from the second cell, means associated with said liquid passage means for regulating the rate of transfer of said liquid from the first to the second cell, electrical condenser means in each cell, the dielectric of said condenser means being formed of the liquid in said cells, a measuring bridge circuit having each of said condenser means connected into an arm thereof, means for balancing said bridge, and means for indicating a change in the balance of said bridge caused by a change of the dielectric constant of the liquid in one of said cells.

3. A system for monitoring the dielectric constant of a liquid comprising a first and a second cell, conduit means for consecutively flowing a liquid through said cells, electrical condenser means in each cell, the dielectric of said condenser means being formed of the liquid in the cells, a measuring bridge circuit having each of said condenser means connected into an arm thereof, means for adjusting said bridge to produce and unbalance current of a predetermined intensity range when the liquid in said first and second cells has substantially the same dielectric constant, a monitoring circuit comprising two relay coils, switch means connecting said relay coils in series, the operating current range of one of said coils being within said predetermined unbalance current range and the operating current range of the other coil being above that of said predetermined current range, said switch means being operated by said relay coils, and means for passing said unbalance current through said relay coils, whereby a decrease in said unbalance current to a value below said predetermined range deenergizes both of said relay coils, and an increase of said unbalance current to a value above said predetermined range energizes the second relay coil, and electrical alarm means responsive to the energization condition of said relay coils for indicating said condition.

4. A system for dielectric constant determinations comprising a first cell, liquid passage means for continuously supplying a liquid to said cell, a second cell, restricted liquid passage means in communication between said cells for continuously transferring the liquid from the first to the second cell with a substantial time lag, liquid passage means for continuously removing the liquid from the second cell, means associated with said liquid passage means for regulating the rate of transfer of said liquid from the first to the second cell, electrical condenser means in each cell, the dielectric of said condenser means being formed of the liquid in said cells, a measuring bridge circuit, means connecting the condenser in the first cell with said bridge to form an arm thereof, a variable condenser, means comprising switch means in said bridge circuit for selectively and alternatively connecting the condenser in said second cell and said variable condenser with said bridge to form a second arm thereof, means for balancing said bridge, and means for indicating the state of balance of said bridge.

5. A system for dielectric constant determinations comprising a first cell, liquid passage means for continuously supplying a liquid to said cell, a second cell, restricted liquid passage means in communication between said cells for continuously transferring the liquid from the first to the second cell with a substantial time lag, liquid passage means for continuously removing the liquid from the second cell, means associated with said liquid passage means for regulating the rate of transfer of said liquid from the first to the second cell, electrical condenser means in each cell, the dielectric of said condenser means being formed of the liquid in said cells, a measuring bridge circuit having each of said condenser means connected into an arm thereof, means for adjusting the bridge to produce an unbalance current within a predetermined range when the liquid in said first and second cells has substantially the same dielectric constant, and signalling means connected to said bridge and adapted to be actuated by said unbalance current upon a variation thereof to a value outside of said predetermined range.

CHARLES H. FAY.

REFERENCES CITED

The following references are of record in the file of this patent:

UNITED STATES PATENTS

| Number | Name | Date |
| --- | --- | --- |
| 1,145,509 | Pike et al. | July 6, 1915 |
| 1,701,331 | Merrill | Feb. 5, 1929 |
| 1,895,118 | Allen | Jan. 24, 1933 |
| 1,951,035 | Parker | Mar. 13, 1934 |
| 2,008,857 | Flanders | July 23, 1935 |
| 2,068,499 | MacKenzie | Jan. 19, 1937 |
| 2,071,607 | Bjorndal | Feb. 23, 1937 |
| 2,129,058 | Hedden | Sept. 6, 1938 |
| 2,349,992 | Schrader | May 30, 1944 |
| 2,485,579 | Elliott | Oct. 25, 1949 |
| 2,499,626 | Bowman | Mar. 7, 1950 |